United States Patent [19]

Culley, Jr.

[11] 4,417,680
[45] Nov. 29, 1983

[54] LUMBER FEEDER

[76] Inventor: Donnell H. Culley, Jr., P.O. Box 118, Whitesburg, Tenn. 37891

[21] Appl. No.: 331,539

[22] Filed: Dec. 17, 1981

[51] Int. Cl.³ .................... B65H 17/22; G03B 1/24
[52] U.S. Cl. .................................. 226/181; 226/58; 226/81
[58] Field of Search ............ 226/168, 174, 175, 176, 226/179, 181, 186, 190, 191, 81, 58; 198/780, 782, 628

[56] References Cited

U.S. PATENT DOCUMENTS

| | | | |
|---|---|---|---|
| 1,289,238 | 12/1918 | Underdonk | 226/191 X |
| 2,387,446 | 10/1945 | Herz | 198/628 |
| 2,953,291 | 9/1960 | Huck | 226/191 X |
| 3,986,652 | 10/1976 | Perkins | 226/181 |

Primary Examiner—Leonard D. Christian
Attorney, Agent, or Firm—Woodford R. Thompson, Jr.

[57] ABSTRACT

Apparatus for feeding pieces of lumber along a path with the center lines of the pieces extending along a preselected datum plane in the direction of the path. A plurality of spaced apart, upper and lower transverse members are mounted for rotation about horizontal axes at opposite sides of the datum plane with the lower side of each upper transverse member and the upper side of each lower transverse member traveling in the direction of the path of movement of the lumber to provide oppositely disposed transverse members at opposite sides of the datum plane. Outwardly projecting lumber engaging members carried by the oppositely disposed transverse members are yieldably urged toward the adjacent sides of the pieces of lumber therebetween with substantially equal force to maintain the center line of the pieces of lumber along the preselected datum plane.

7 Claims, 9 Drawing Figures

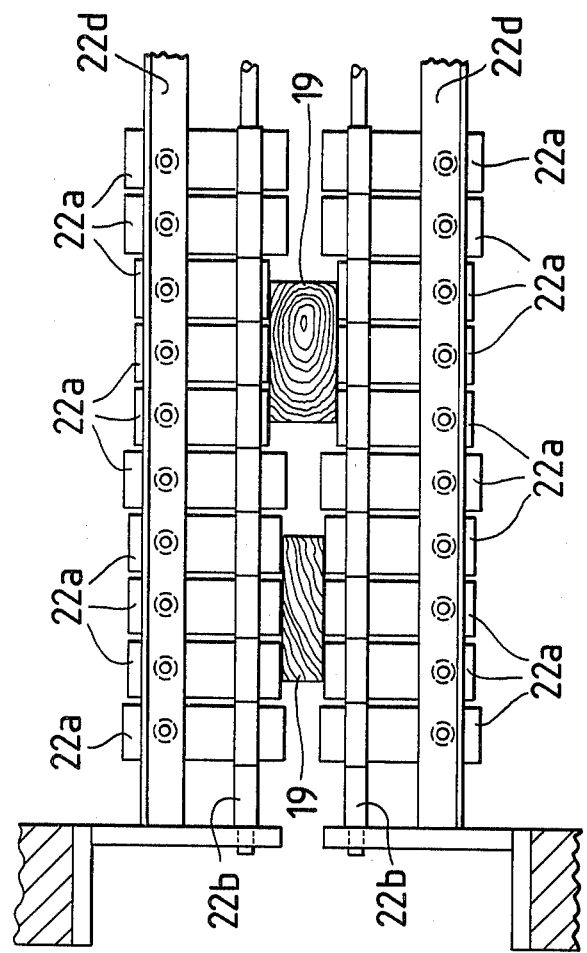
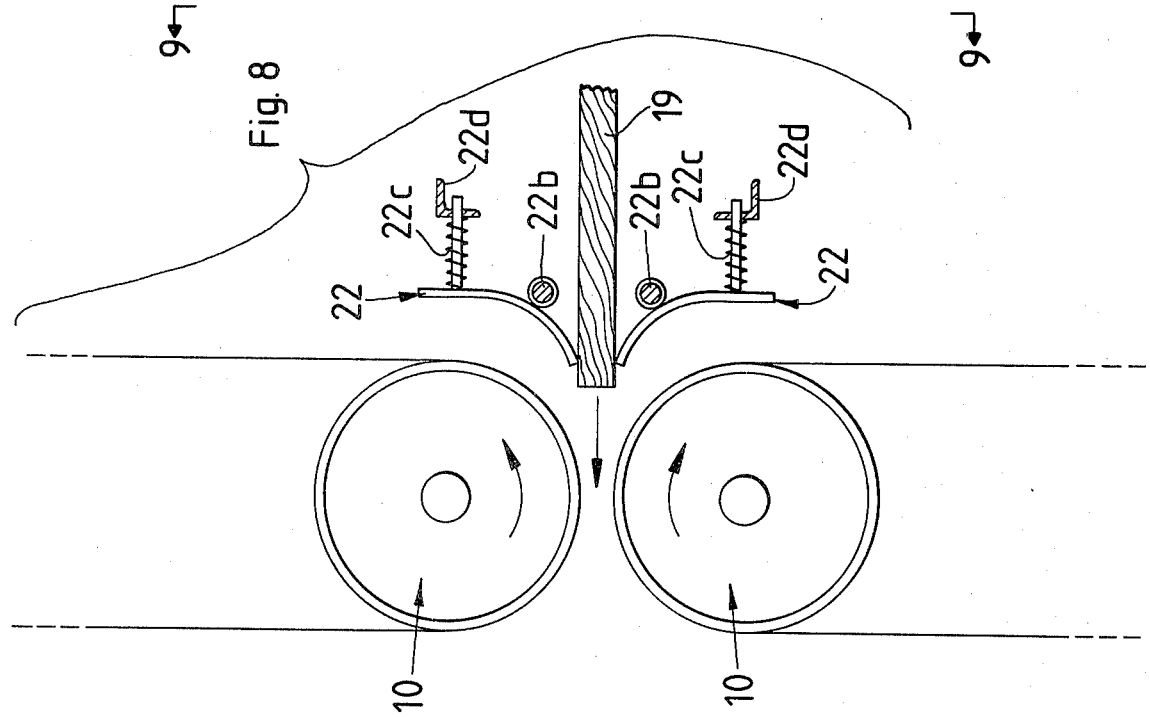

LUMBER FEEDER

BACKGROUND OF THE INVENTION

This invention relates to apparatus for feeding lumber or the like and more particularly to improved apparatus for feeding pieces of lumber of various thicknesses and widths arranged in side-by-side relationship relative to each other along a path with the center lines of the pieces extending substantially on a preselected datum plane in the direction of movement of the lumber or the like.

Heretofore in the art to which my invention relates, various types of apparatus have been proposed for feeding pieces of lumber to other apparatus for finishing the same. Such finishing apparatus usually employs opposing sanding belts or rotating cutter heads on opposite sides of the path along which the pieces of lumber or the like are conveyed. The sanding belts or cutter heads operate to remove substantially equal amounts of material from opposite sides of the board being finished. Accordingly, it is very desirable to maintain the longitudinal center line of the board midway between the opposing sanding belts or cutter heads since the spacing therebetween determines the final thickness of the lumber.

Conventional apparatus, with which I am familiar, heretofore used to convey pieces of lumber or the like for further finishing operations employed endless chain drive units which engage the lumber being conveyed. Such prior art apparatus requires complicated hydraulic and/or mechanical biasing mechanisms to move the lumber engaging chains equal distances relative to opposite sides of the datum plane to thus maintain the center line of the boards being conveyed on the datum plane. With some prior art conveying apparatus such as shown in U.S. Pat. No. 3,915,290, the individual links of the conveying chain actually engage the pieces of lumber being conveyed. This results in considerable wear of the chain links at the point of contact with the lumber. Accordingly, proper engagement of the chain links with the pieces of lumber being conveyed and efficient movement of such pieces into and through the finishing apparatus is significantly impaired. Also, considerable time and effort is required with such apparatus to maintain it in proper operating order.

Other conventional lumber feeders employing endless chain drive units to convey pieces of lumber or the like along a path are illustrated in the following U.S. Pat. Nos. 1,746,697; 1,911,961; 2,387,446; 2,546,476; 3,143,269; 3,258,110; 3,386,565; and 3,847,271.

SUMMARY OF THE INVENTION

In accordance with my invention, I overcome the above and other difficulties by providing improved apparatus for feeding lumber or the like which is simple of construction, economical of manufacture and which requires a minimum of maintenance.

An object of my invention is to provide improved apparatus for conveying pieces of lumber or the like along a path with the center line of each piece being maintained substantially on a preselected datum plane whereby substantially equal quantities of material are removed from opposite sides of the boards.

A more specific object of my invention is to provide rotatable members which are mounted at opposite sides of a preselected datum plane and carry outwardly projecting elements which are yieldably biased with substantially equal force toward opposite sides of a piece of lumber passing therebetween, whereby he outwardly projecting elements move substantially equal distances to maintain the center line of each board on the datum plane.

Another object of my invention is to provide improved apparatus which does not require the use of complicated hydraulic or mechanical biasing mechanisms for moving the lumber engaging elements equal distances relative to opposite sides of the datum plane.

My improved apparatus embodies a plurality of spaced apart upper transverse members mounted for rotation about horizontal axes above a preselected datum plane. A plurality of spaced apart, lower transverse members are mounted for rotation about horizontal axes below the datum plane. The transverse members carry outwardly projecting lumber engaging elements which are yieldably urged toward the adjacent sides of a piece of lumber being conveyed. The lumber engaging elements engage the pieces of lumber with substantially equal force to provide substantially equal spacing of the lumber engaging elements from the datum plane.

DESCRIPTION OF THE DRAWINGS

Apparatus embodying features of my invention is illustrated in the accompanying drawings, forming a part of this application, in which:

FIG. 8 is an enlarged, fragmental elevational view, partly in section, showing upper and lower infeed shoes engaging adjacent sides of a piece of lumber being conveyed; and, FIG. 9 is an elevational view taken generally along the line 9—9 of FIG. 8.

DETAILED DESCRIPTION

Figure 1:
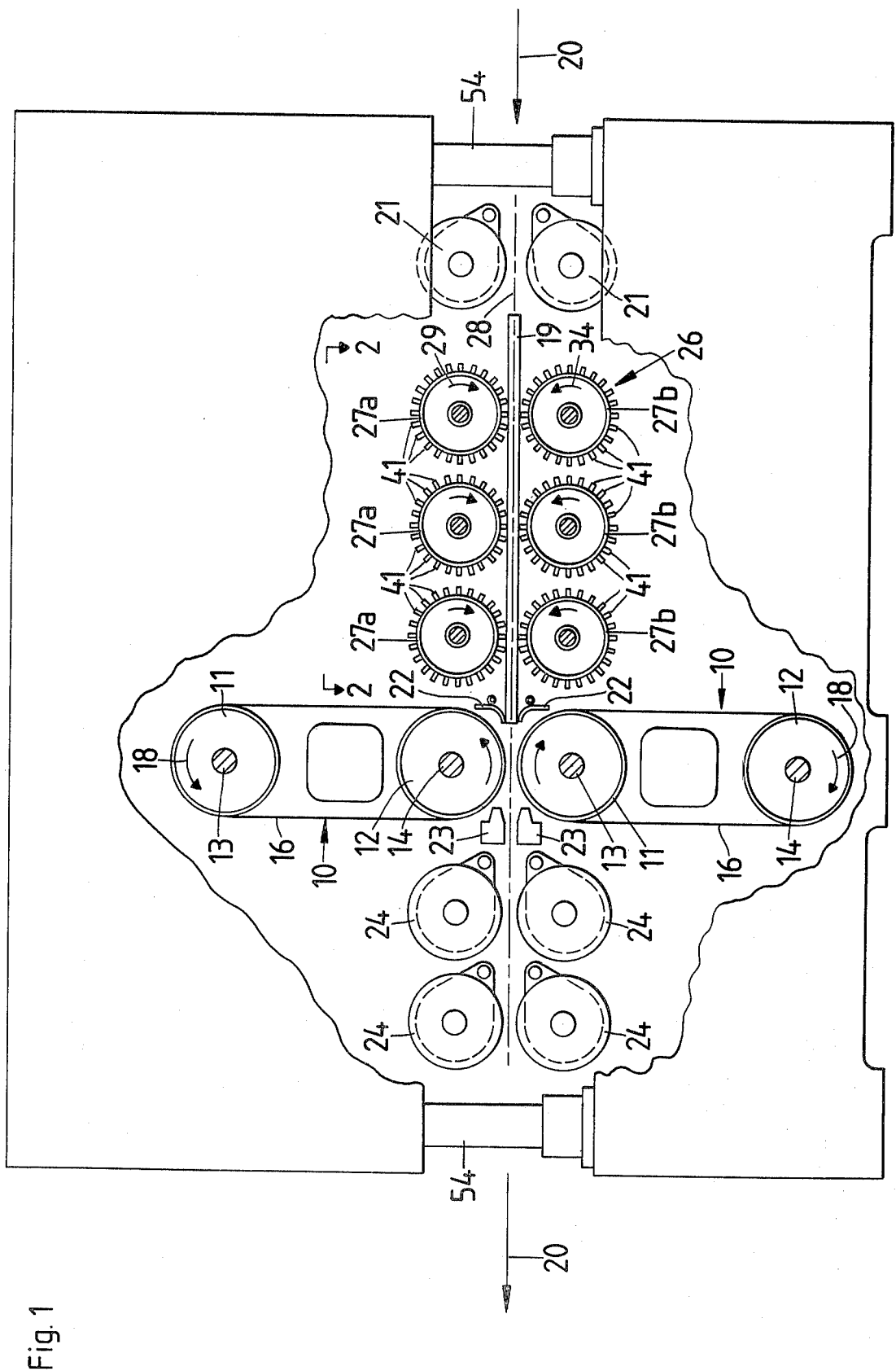
FIG. 1 is a side elevational view showing my improved apparatus associated with a conventional type sanding machine.

Referring now to the drawings for a better understanding of my invention, I show in FIG. 1 a wide-belt sanding machine which is provided with conventional sander units 10. Each sander unit is shown as having vertically spaced drums 11 and 12 which are mounted for rotation on parallel, horizontally supported shafts 13 and 14, respectively. The usual wide, abrasive belt 16 surrounds each pair of drums 11 and 12, as shown. The sander units 10 are mounted for vertical adjustment relative to each other by conventional means well understood in the art to which my invention relates whereby the spacing therebetween may be varied. The belts 16 may be driven by conventional chain and sprocket drive units 17 in the direction of the arrows 18 while the pieces of lumber being fed, indicated at 19, are conveyed along a path in the direction indicated by arrows 20.

The usual infeed rolls 21 are provided at the entry side of my apparatus to aid in conveying the pieces of lumber 19 in the direction of the arrow 20. Upper and lower segmented infeed shoes 22 are provided at the entry side of the sander units 10 to aid in introducing the pieces 19 into the space between the sander units, as shown in FIGS. 8 and 9. Each infeed shoe 22 comprises a plurality of movable elements 22a which are mounted for independent pivotal movement in side-by-side relationship on a transversely extending shaft 22b, as shown in FIG. 9. A compression spring 22c is interposed between each movable element 22a and an adjacent backup member 22d whereby the movable elements are urged into engagement with adjacent sides of the pieces of lumber 19 being conveyed toward the sander units 10. That is, the springs 22c urge the lower portions of the upper movable elements and the upper portions of the lower movable elements into engagement with adjacent sides of the pieces of lumber 19 whereby the center lines of the pieces of lumber are maintained on a preselected datum plane which is substantially midway between the sander units 10. The usual outfeed shoes 23 and outfeed rolls 24 may be provided at the delivery side of the sander units to aid in removing the sanded boards. In view of the fact that the sander units are of a conventional type, no further description thereof is deemed necessary.

Figure 2:
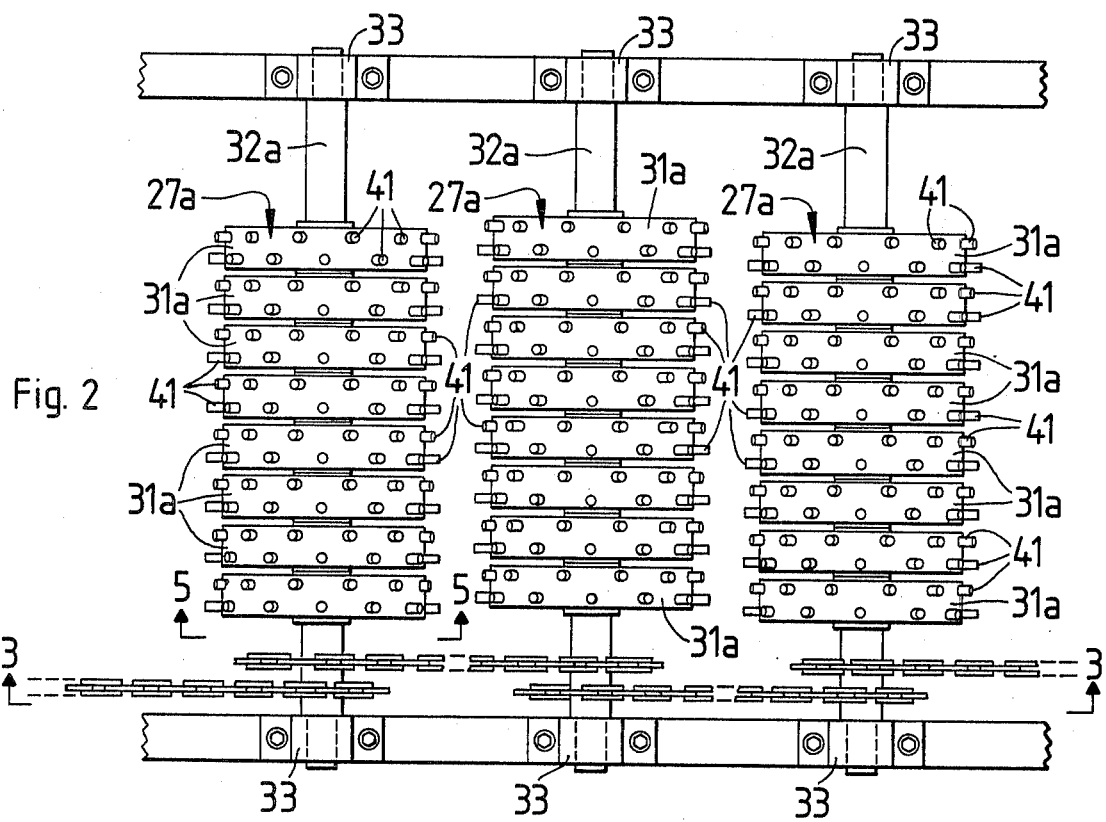
FIG. 2 is an enlarged top plan view taken generally along the line 2—2 of FIG. 1.

My improved apparatus for feeding pieces of lumber 19 between the sander units 10 is indicated generally at 26, in FIG. 1. The feeder comprises a plurality of spaced apart, upper transverse members 27a which are mounted for rotation about horizontal axes above the preselected datum plane, indicated by the dot-dash line 28, in FIG. 1. The transverse members 27a are rotated in the direction of the arrows 29 with the lower side of each member 27a traveling in the direction of the path indicated by arrow 20. As shown in FIG. 2, each upper transverse member 27a comprises a plurality of rollers 31a which are mounted non-rotatably on a horizontal shaft 32a in axial alignment with each other. Suitable roller bearings 33 support each end of the shaft 32a, as shown in FIG. 7.

Figure 3:
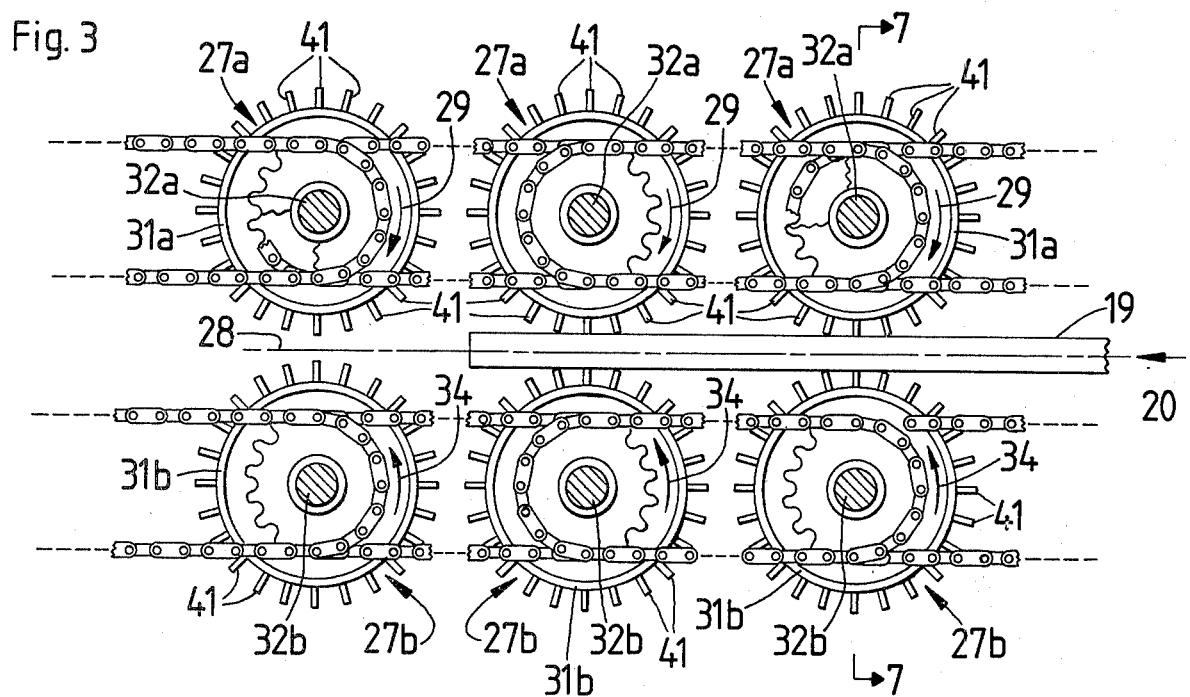
FIG. 3 is a fragmental elevational view, partly in section, taken generally along the line 3—3 of FIG. 2.

A plurality of spaced apart, lower transverse members 27b are mounted for rotation about horizontal axes below the datum plane 28, as shown in FIG. 3. The lower transverse members 27b are rotated in the direction indicated by the arrows 34, with the upper side of each lower transverse member traveling in the direction of the path indicated by arrow 20. Each lower transverse member 27b is vertically aligned with its corresponding upper transverse member 27a to provide pairs of oppositely disposed transverse members at opposite sides of the datum plane 28. Each lower transverse member 27b comprises a plurality of rollers 31b which are mounted non-rotatably on a horizontal shaft 32b in axial alignment with each other. Suitable roller bearings 33 also support the ends of the shaft 32b.

Figure 6:
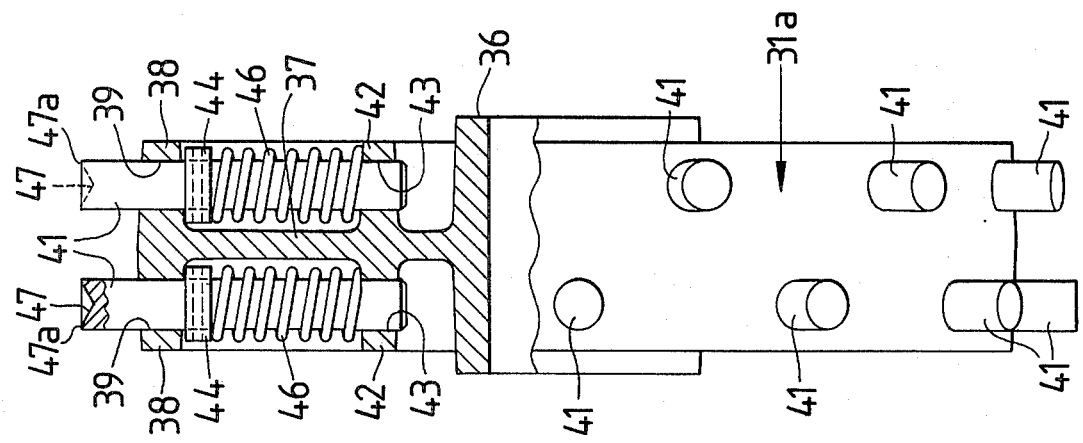
FIG. 6 is an elevational view, partly in section, taken generally along the line 6—6 of FIG. 5.
Figure 5:
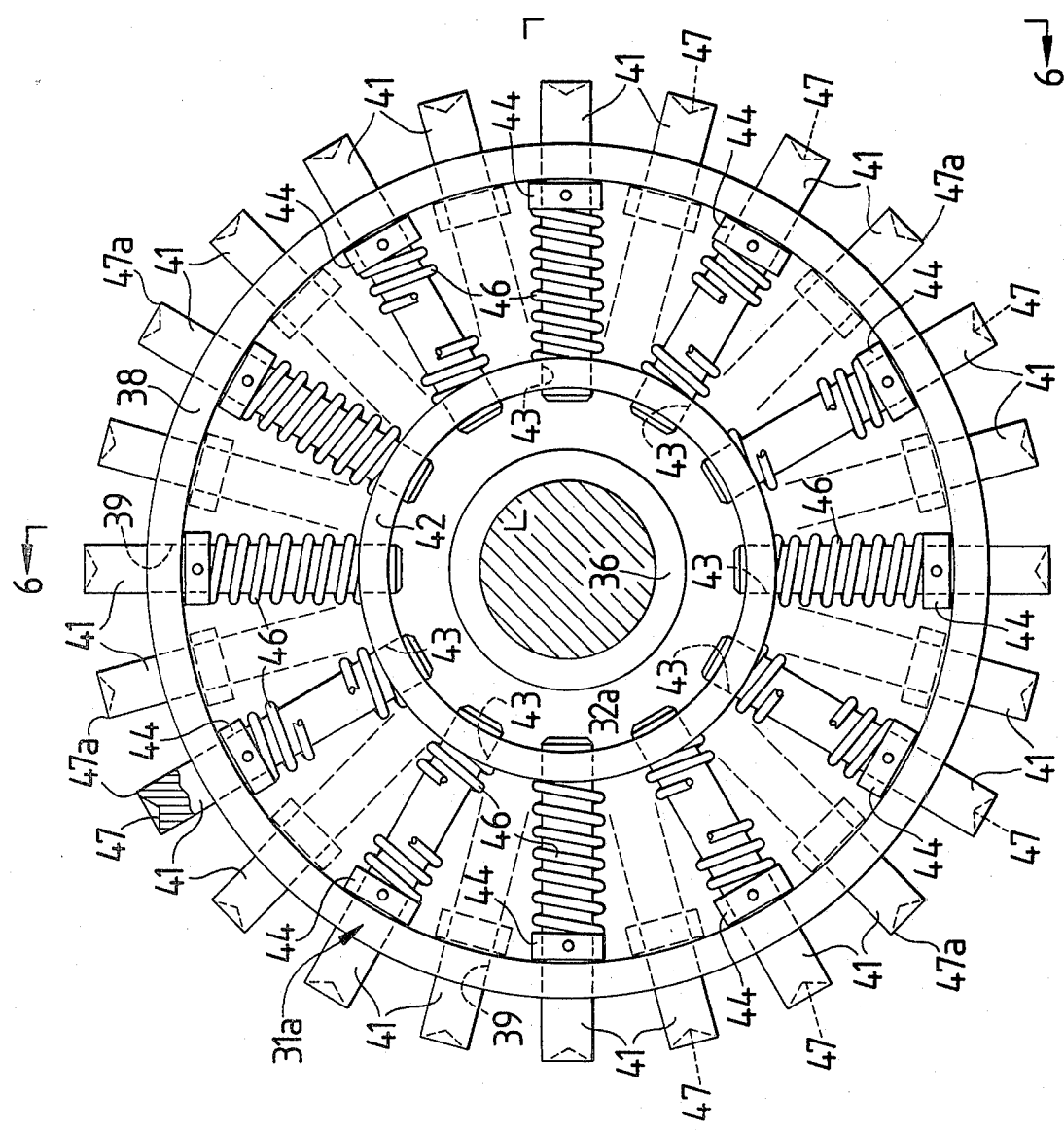
FIG. 5 is an enlarged elevational view taken generally along the line 5—5 of FIG. 2.
Figure 7:
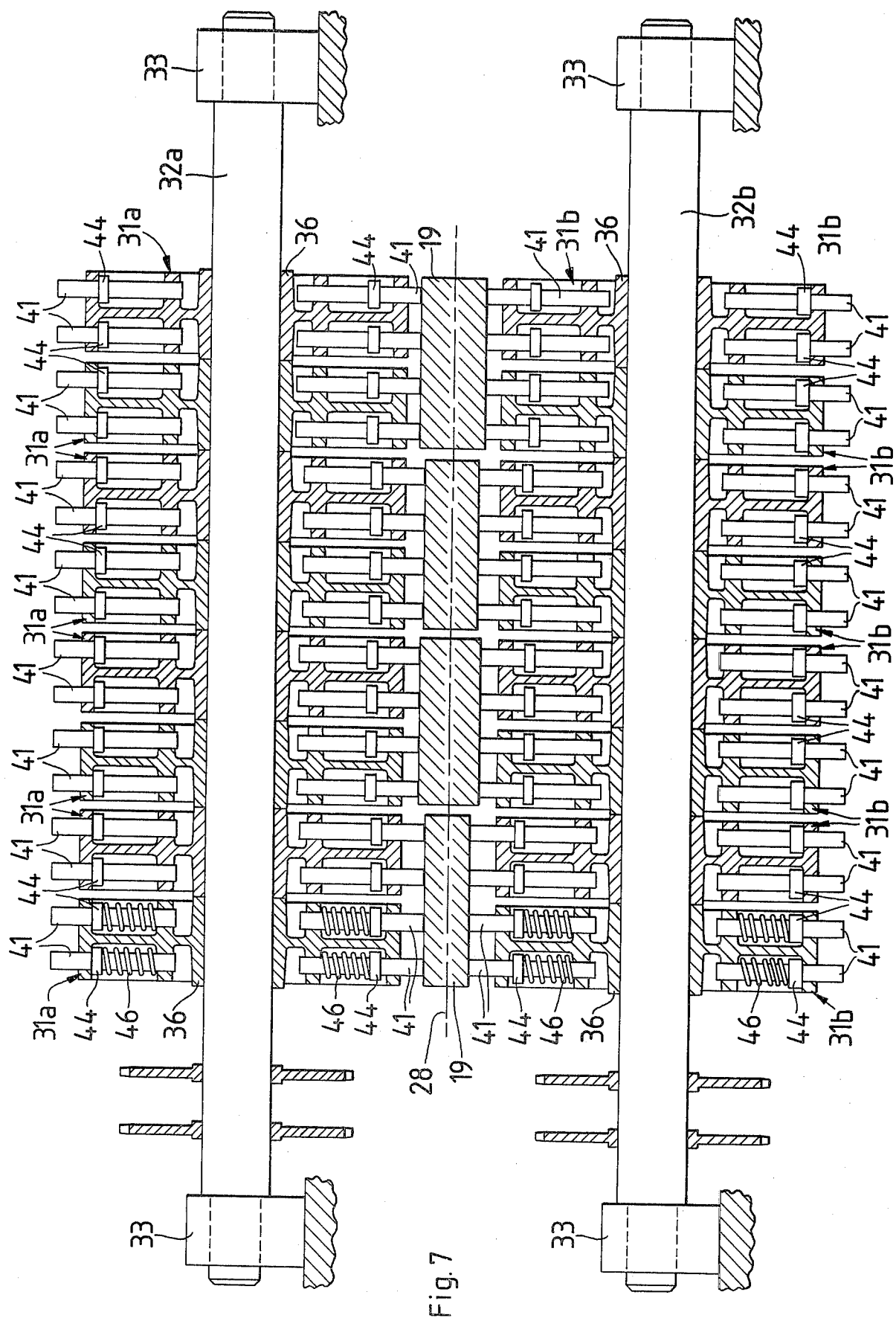
FIG. 7 is a sectional view taken generally along the line 7—7 of FIG. 3.

The rollers 31a and 31b are shown in FIG. 7 as being identical in structure with each comprising a hub 36 which is adapted to be mounted non-rotatably on shaft 32a or 32b, as the case may be. A radially and outwardly extending annular member 37 is carried by the hub 36 as shown in FIGS. 5 and 6. A first pair of oppositely disposed, annular flanges 38 project laterally and outwardly from the annular member 37 adjacent the outer circumference thereof. Angularly spaced, radially extending openings 39 are provided in the flanges 38 for receiving outwardly projecting lumber engaging members 41 which are shown as being in the form of pins. A second pair of oppositely disposed annular flanges 42 project laterally and outwardly from the annular member 37 adjacent the inner circumference thereof. Angularly spaced openings 43 are provided in the flanges 42 in radial alignment with the openings 39 for receiving the inner ends of the lumber engaging members 41. The openings 39 and 43 thus define retainer elements for receiving the lumber engaging members 41.

A collar 44 is secured to each lumber engaging member 41 inwardly of the adjacent annular flange 38, as shown. A compression spring 46 surrounds each lumber engaging pin 41 between its collar 44 and the adjacent annular flange 42 whereby each lumber engaging member 41 is yieldably urged into engagement with the adjacent side of the piece of lumber 19 being conveyed. Accordingly, substantially equal force is applied to opposite sides of the lumber by the members 41 whereby the lumber engaging members are spaced substantially equal distance from the datum plane 28. The longitudinal center line of each piece of lumber 19 is thus maintained substantially on the datum plane 28 midway between the lumber engaging members 41. Also, each of the lumber engaging members 41 carried by the upper or lower transverse member of each pair of oppositely disposed transverse member extends generally toward a lumber engaging member 41 carried by its associated transverse member at the point of contact with a piece of lumber 19 to provide generally oppositely disposed lumber engaging members at opposite sides of the datum plane 28 at the point of contact with the piece of lumber.

As shown in FIG. 5, the lumber engaging end of each lumber engaging member 41 is concaved at 47 to provide an annular contact edge 47a.

Figure 4:
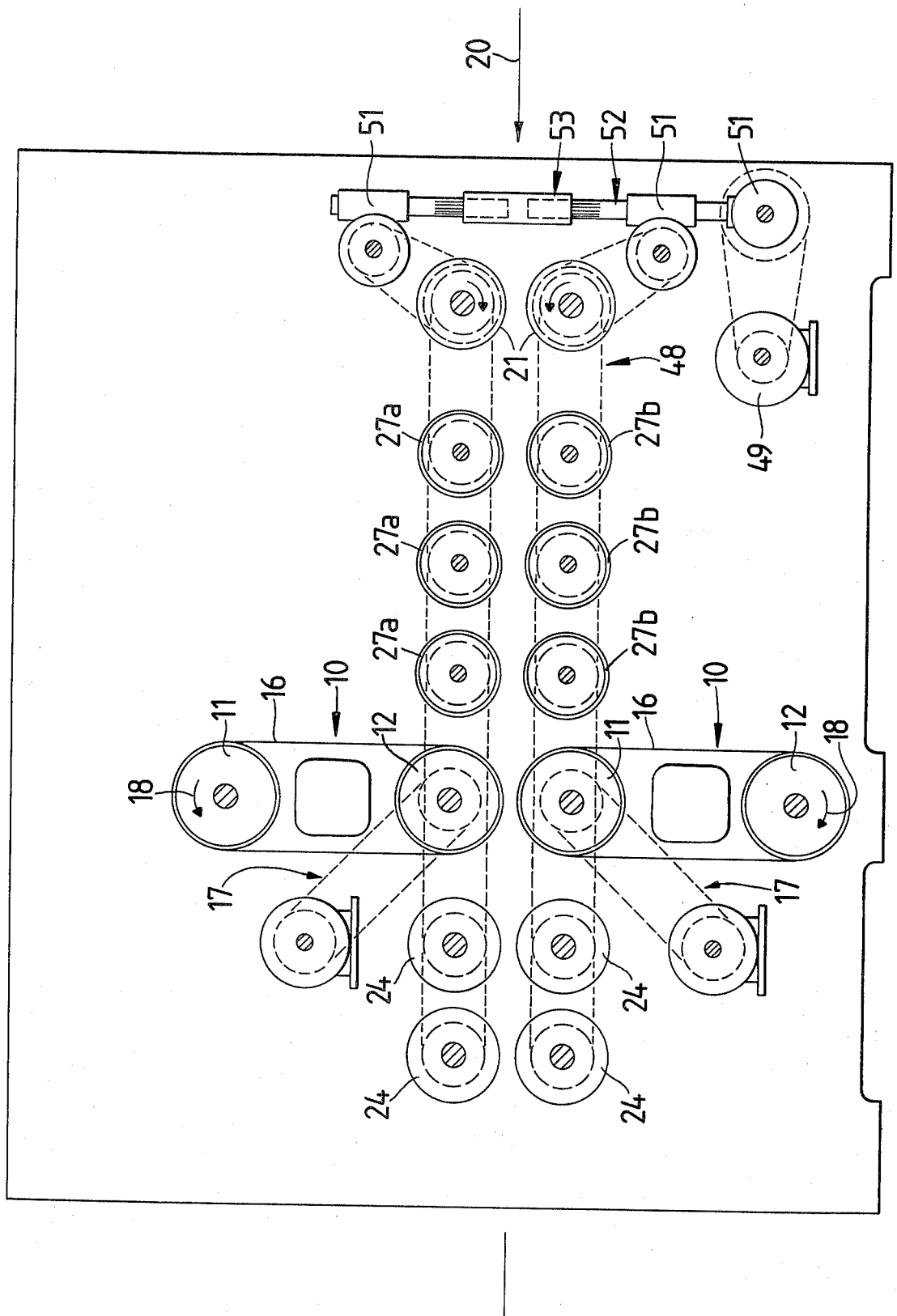
FIG. 4 is a diagrammatic elevational view corresponding to FIG. 1 showing the drive assembly associated with my improved apparatus.

As shown in FIGS. 2, 3 and 4, a conventional chain drive assembly, indicated generally at 48, is operatively connected to the infeed rolls 21, outfeed rolls 24 and each of the upper and lower transverse members 27a and 27b, respectively. The drive assembly 48 thus transmits rotary motion to the upper and lower transverse members whereby they are rotated at substantially the same speed with the lower sides of the upper transverse members and the upper sides of the lower transverse members traveling in the direction of the path indicated by arrow 20. Accordingly, the pieces of lumber 19 are conveyed toward the sander units 10. The drive assembly is shown as including a conventional motor 49 operatively connected to suitable gear reduction units 51 and an adjustable, vertically extending, drive shaft 52. As shown in FIG. 4, the drive shaft 42 includes a telescoping spline connection 53 which permits adjustment of the effective length of the shaft 52 whereby the vertical positions of the transverse members 27a and 27b relative to each other may be varied by suitable means, such as by conventional jack screws 54. The vertical adjustment of the upper and lower transverse members relative to each other is utilized to compensate for the weight of the boards being conveyed. Since the use of conventional drive means to transmit power from the motor 49 to the infeed rolls 21, upper and lower transverse members 27a and 27b, respectively, and outfeed rolls 24 is well understood in the art, no further description thereof is deemed necessary.

From the foregoing description, the operation of my improved lumber feeder will be readily understood.

With the upper and lower transverse members 27a and 27b, respectively, adjusted vertically to the desired spacing relative to each other, pieces of lumber 19 are fed along the datum plane 28 in the direction indicated by the arrow 20. The pieces of lumber 19 are fed through the infeed rolls 21 where they are then engaged by the lumber engaging members 41, as shown in FIGS. 1 and 2. The oppositely disposed lumber engaging members 41 contact opposite sides of the pieces of lumber with substantially equal force whereby the center line of the pieces of lumber are maintained substantially on the datum plane 28 as they are conveyed toward the sander units 10. This assures the removal of substantially equal amounts of material from each side of the pieces of lumber 19 as they pass through the sander units 10. Outfeed rolls 24 then engage and remove the sanded pieces of lumber 19 in the usual manner.

From the foregoing, it will be seen that I have devised improved apparatus for feedng pieces of lumber along a path with the center lines of the pieces of lumber maintained on a preselected datum plane. By providing a plurality of spaced apart upper and lower transverse members having outwardly projecting lumber engaging members which extend toward each other at the point of contact with a piece of lumber therebetween, generally oppositely disposed lumber engaging members are provided at opposite sides of the datum plane at the point of contact with the piece of lumber. Also, by providing yieldable means for urging such lumber engaging members toward each other with substantially equal force and with substantially equal spacing from the datum plane, the longitudinal center line of each piece of lumber is maintained on the datum plane and substantially midway between the lumber engaging members. Accordingly, substantially equal amounts of material are removed from opposite sides of the pieces of lumber being conveyed. Furthermore, by providing improved apparatus which eliminates the use of endless chain drive units for carrying the lumber engaging members, the construction of my improved lumber feeder is not only simplified but maintenance and operating cost is greatly reduced.

While I have shown three pairs of oppositely disposed, upper and lower transverse members employed to convey the pieces of lumber along the datum plane, it will be apparent that two or more pairs may be employed.

While I have shown my invention in but one form, it will be obvious to those skilled in the art that it is not so limited, but is susceptible of various changes and modifications without departing from the spirit thereof.

What I claim is:

1. In apparatus for feeding pieces of lumber of various thicknesses arranged in side-by-side relationship to each other along a path with the center lines of said pieces extending substantially on a preselected datum plane in the direction of said path, the improvement comprising,
   (a) a plurality of spaced apart, upper transverse members mounted for rotation about horizontal axes above said datum plane with the lower sides of said upper transverse members traveling in the direction of said path,
   (b) a plurality of spaced apart, lower transverse members mounted for rotation about horizontal axes below said datum plane with the upper sides of said lower transverse members traveling in the direction of said path,
   (c) drive means operatively connected to said upper and lower transverse members for imparting rotation thereto at substantially the same speed,
   (d) each of said transverse members comprising a plurality of rollers mounted non-rotatably on a horizontal shaft and in axial alignment with each other with each roller having a hub mounted on said horizontal shaft,
   (e) a radially extending, annular member carried by said hub,
   (f) a first pair of oppositely disposed, annular flanges projecting laterally and outwardly from said annular member adjacent the outer circumference thereof with there being radially extending openings in said first pair of annular flanges,
   (g) a second pair of oppositely disposed annular flanges projecting laterally and outwardly from said annular member adjacent the inner circumference thereof with there being radially extending openings in said second pair of annular flanges and in radial alignment with said radially extending openings in said first pair of annular flanges,
   (h) outwardly projecting lumber engaging pins mounted for radial movement within said radially extending openings in said first and second pair of annular flanges in position to engage opposite sides of a piece of lumber therebetween and move said piece of lumber in the direction of said path, and
   (i) spring means urging said lumber engaging pins into engagement with said opposite sides of said piece of lumber therebetween with substantially equal force and providing substantially equal spacing of said lumber engaging members from said datum plane.

2. Apparatus for feeding pieces of lumber as defined in claim 1 in which a collar is secured to each said lumber engaging pin inwardly of the adjacent annular flange of said first pair of annular flange and said spring is a compression spring surrounding said pin between said collar and the adjacent annular flange of said second pair of annular flanges.

3. Apparatus for feeding pieces of lumber as defined in claim 1 in which the lumber engaging end of each said pin is concave to provide an annular contact surface.

4. Apparatus for feeding pieces of lumber as defined in claim 1 in which adjustable means is provided for adjusting the vertical position of said upper and lower transverse members relative to each other to compensate for the weight of said pieces of lumber conveyed.

5. Apparatus for feeding pieces of lumber as defined in claim 1 in which segmented infeed shoes are yieldably mounted at opposite sides of said datum plane in position to engage adjacent sides of said pieces of lumber conveyed along said path to maintain the center lines of said pieces of lumber substantially on said datum plane.

6. Apparatus for feeding pieces of lumber as defined in claim 5 in which each said infeed shoe comprises,
   (a) a plurality of movable elements mounted for independent pivotal movement in side-by-side relationship to each other on a shaft extending transversely of said path, and
   (b) resilient means urging each said movable element into engagement with the side of a piece of lumber being conveyed adjacent thereto.

7. In apparatus for feeding pieces of lumber of various thicknesses arranged in side-by-side relationship to each other along a path with the center lines of said pieces extending substantially on a preselected datum plane in the direction of said path, the improvement comprising, (a) a plurality of spaced apart, upper transverse members mounted for rotation about horizontal axes above said datum plane with the lower sides of said upper transverse members traveling in the direction of said path, (b) a plurality of spaced apart, lower transverse members mounted for rotation about horizontal axes below said datum plane with the upper sides of said lower transverse members traveling in the direction of said path and with each said lower transverse member being in vertical alignment with an upper transverse member to provide pairs of oppositely disposed transverse members at opposite sides of said datum plane, (c) drive means operatively connected to said upper and lower transverse members for imparting rotation thereto at substantially the same speed, (d) outwardly projecting radially extending pins carried by said upper and lower transverse members in position to engage opposite sides of a piece of lumber therebetween and move said piece of lumber in the direction of said path with each said radially extending pin carried by one transverse member of each pair of oppositely disposed transverse members extending toward a radially extending pin carried by the other transverse member of said pair at the point of contact with a piece of lumber therebetween to provide oppositely disposed lumber engaging pins at opposite sides of said datum plane at said point of contact, and (e) spring means urging said radially extending pins into engagement with said opposite sides of said piece of lumber therebetween with substantially equal force and providing substantially equal spacing of said lumber engaging members from said datum plane.

* * * * *